United States Patent
Novo Diaz

(10) Patent No.: US 11,916,970 B2
(45) Date of Patent: Feb. 27, 2024

(54) SECURITY INFORMATION EXCHANGE BETWEEN A CLIENT AND A SERVER

(71) Applicant: Telefonaktiebolaget LM Ericsson (publ), Stockholm (SE)

(72) Inventor: Oscar Novo Diaz, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 236 days.

(21) Appl. No.: 16/962,689

(22) PCT Filed: Jul. 12, 2018

(86) PCT No.: PCT/EP2018/068880
§ 371 (c)(1),
(2) Date: Jul. 16, 2020

(87) PCT Pub. No.: WO2020/011356
PCT Pub. Date: Jan. 16, 2020

(65) Prior Publication Data
US 2020/0366718 A1    Nov. 19, 2020

(51) Int. Cl.
*H04L 9/40* (2022.01)
*H04L 9/32* (2006.01)
*H04L 67/01* (2022.01)
*H04L 67/51* (2022.01)

(52) U.S. Cl.
CPC .......... *H04L 63/205* (2013.01); *H04L 9/3242* (2013.01); *H04L 63/0428* (2013.01); *H04L 63/166* (2013.01); *H04L 67/01* (2022.05); *H04L 67/51* (2022.05)

(58) Field of Classification Search
CPC .................................................. H04L 63/205
See application file for complete search history.

(56) References Cited

U.S. PATENT DOCUMENTS

| | | |
|---|---|---|
| 8,407,472 B2 | 3/2013 | Hao et al. |
| 9,438,564 B1 | 9/2016 | Weng et al. |
| 9,923,923 B1 * | 3/2018 | Sharifi Mehr ...... H04L 63/0428 |

(Continued)

FOREIGN PATENT DOCUMENTS

| | | | |
|---|---|---|---|
| FR | 2901084 A1 * | 11/2007 | ........... H04L 63/061 |
| WO | 2017004373 A1 | 1/2017 | |

OTHER PUBLICATIONS

PCT International Search Report and Written Opinion dated Mar. 14, 2019 for International Application PCT/EP2018/068880, 11 pages.

(Continued)

*Primary Examiner* — Esther B. Henderson
(74) *Attorney, Agent, or Firm* — Sage Patent Group

(57) ABSTRACT

A server node is configured to assume a server role in a particular message exchange with a client node. The server node registers, with a resource directory node, security information (e.g., security capabilities and/or security preferences) of the server node. The server node may also register information about a resource that the server node hosts. The client node determines, from the resource directory node, the security information (e.g., security capabilities and/or security preferences) of the server node. The client node then sets up a secured connection with the server node using the determined security information (e.g., security capabilities and/or security preferences).

13 Claims, 12 Drawing Sheets

(56) References Cited

U.S. PATENT DOCUMENTS

| | | | | |
|---|---|---|---|---|
| 9,973,481 | B1* | 5/2018 | Sharifi Mehr | H04L 9/0825 |
| 2008/0313698 | A1* | 12/2008 | Zhao | H04W 12/069 |
| | | | | 709/228 |
| 2018/0183802 | A1* | 6/2018 | Choyi | H04L 63/105 |
| 2018/0288062 | A1* | 10/2018 | Goyal | H04L 63/0281 |
| 2019/0141078 | A1* | 5/2019 | Punadikar | H04L 9/0816 |

OTHER PUBLICATIONS

Centos, "Mirror List" Retrieved from the Internet: URL: https://web.archive.org/web/20180222040246/https://wwwcentos.org/download/mirrors/, accessed Mar. 6, 2019, 24 pages.

E. Rescorla, "The Transport Layer Security (TLS) Protocol Version 1.3", draft-ietf-tls-tls13-28, Network Working Group, Internet-Draft, Mar. 20, 2018, 157 pages.

Shelby et al., "The Constrained Application Protocol (CoAP)", Internet Engineering Task Force (IETF), Request for Comments: 7252, Category: Standards Track, ISSN: 2070-1721, Jun. 2014, 113 pages.

Rescorla, et al., "The Datagram Transport Layer Security (DTLS) Protocol Version 1.3", draft-ietf-tls-dtls13-38, TLS Internet-Draft, May 29, 2020, 62 pages.

Shelby, et al., "CoRE Resource Directory", draft-ietf-core-resource-directory-24, CoRE, Internet-Draft, Mar. 9, 2020, 80 pages.

Salowey & Turner, "IANA Registry Updates for TLS and DTLS", Internet Engineering Task Force (IETF), Request for Comments: 8447, Category: Standards Track, ISSN: 2070-1721, Aug. 2018, 20 pages.

Dierks & Rescorla, "The Transport Layer Security (TLS) Protocol Version 1.2", Network Working Group, Category: Standards Track, Aug. 2008, 104 pages.

* cited by examiner

| TLS/DTLS version | Identifiers |
|---|---|
| 1.0 | 0 |
| 1.1 | 1 |
| 1.2 | 2 |
| 1.3 | 3 |

*FIG. 3A*

Req: POST coap://rd.example.com/rd?ep=node1&tv="2,3"
  Content-Format: 40
  Payload:
    </sensors/temp>;ct=41;rt="temperature"; anchor=" coap://[2001:db8:3::123]"

Res: 2.01 Created
Location: /rd/4521

*FIG. 3B*

| Cipher Suite | Identifier |
|---|---|
| TLS_NULL_WITH_NULL_NULL | 0 |
| TLS_RSA_WITH_NULL_MD5 | 1 |
| TLS_RSA_WITH_NULL_SHA | 2 |
| ......... | ...... |
| TLS_ECDHE_PSK_WITH_AES_256_GCM_SHA384 | 210 |
| TLS_ECDHE_PSK_WITH_AES_128_CCM_8_SHA256 | 211 |

FIG. 3C

Req: POST coap://rd.example.com/rd?ep=node1&cp="0,211"
Content-Format: 40
Payload:
    </sensors/temp>;ct=41;rt="temperature"; anchor=" coap://[2001:db8:3::123]"

Res: 2.01 Created
Location: /rd/4521

FIG. 3D

Req: GET /rd-lookup/res?rt=temperature&tv=3

Res: 2.05 Content
<coap://[2001:db8:3::123]:61616/temp>;rt="temperature";anchor="coap://[2001:db8:3::123]"

*FIG. 3E*

Req: GET /rd-lookup/res?rt=temperature&tv=2,3&cs=211,0

Res: 2.05 Content
<coap://[2001:db8:3::123]:61616/temp>;rt="temperature";anchor="coap://[2001:db8:3::123]"

*FIG. 3F*

SECURITY INFORMATION EXCHANGE BETWEEN A CLIENT AND A SERVER

CROSS-REFERENCE TO RELATED APPLICATIONS

This application is a 35 U.S.C. § 371 national stage application for International Application No. PCT/EP2018/068880, entitled "SECURITY INFORMATION EXCHANGE BETWEEN A CLIENT AND A SERVER", filed on Jul. 12, 2018, the disclosure and contents of which are hereby incorporated by reference in their entireties.

TECHNICAL FIELD

The present application relates generally to a client node and a server node, and relates more specifically to the exchange of security information between a client node and a sever node.

BACKGROUND

Security protocols such as the Transport Layer Security (TLS) protocol and the Datagram TLS (DTLS) protocol aim to provide data privacy and/or reliability between the nodes that are the endpoints of a connection. When transferred over a secured connection, data may for instance be encrypted and/or checked for integrity (e.g., via message authentication codes). Some security protocols flexibly support different methods for key agreement, data encryption, and/or data integrity authentication. As a result, setup of a secured connection often involves a negotiation or handshake between the nodes to agree on which values to use for configurable parameters. Moreover, as security protocols evolve, different protocol versions emerge and require the nodes to similarly agree on which protocol version to use for the secured connection.

These and other aspects of secured connection setup threaten to increase the latency of communication between the nodes, as well as consume power, memory, and processing resources at the nodes. This proves particularly pertinent and consequential for nodes (e.g., Internet of Things devices, sensors, actuators) whose power, memory, and/or processing resources are already constrained.

SUMMARY

Some embodiments herein exploit a resource directory for effectively assisting nodes in the exchange of security information between those nodes and/or in the set up a secured connection between the nodes. The resource directory may for instance serve as a repository for information that is useful or needed to set up a secured connection with a node. The information may include for instance the security capabilities (e.g., supported security protocol version(s)) and/or the security preferences (e.g., preferred cipher suites and/or key agreement protocols) of the node. This way, another node may retrieve the information from the resource directory (e.g., in advance of the connection setup procedure) and utilize that information for setting up a secured connection between the nodes.

A node that initiates the secured connection as a client node may for instance already initiate the connection using the security capabilities and/or security preferences of a targeted server node, thereby reducing or eliminating the extent to which the nodes have to negotiate during the connection setup procedure. This may in turn reduce the setup latency and/or node resource consumption. In fact, in some embodiments, the resource directory also serves as a repository for information describing what resources are hosted by nodes in a network. In this case, nodes are configured to query the resource directory anyway for resource discovery, meaning that retrieval of security information from the resource directory according to some embodiments herein contributes little to no additional latency and/or resource consumption.

More particularly, embodiments herein include a method performed by a client node configured to assume a client role in a particular message exchange with a server node. The method comprises determining, from a resource directory node that stores information about resources, security capabilities and/or security preferences of a server node that hosts a resource. The method also comprises setting up a secured connection between the client node and the server node using the determined security capabilities and/or security preferences. In some embodiments, setting up the secured connection comprises initiating setup of the secured connection according to the security capabilities and/or security preferences of the server node.

In one or more embodiments, determining the security capabilities and/or security preferences of the server node comprises transmitting, from the client node to the resource directory node, a request for information about resources or server nodes associated with one or more certain target attributes, where the target attributes include certain security capabilities and/or security preferences. In this case, the determination may comprise receiving a response from the resource directory node identifying the server node, or one or more resources hosted by the server node, as being associated with the one or more certain target attributes.

In other embodiments, determining the security capabilities and/or security preferences of the server node comprises transmitting, from the client node to the resource directory node, a request for information about resources or serve nodes associated with one or more certain target attributes. In this case, the determination may entail receiving a response from the resource directory node that identifies the server node, or one or more resources hosted by the server node, as being associated with the one or more certain target attributes and that includes information indicating the security capabilities and/or security preferences of the server node.

Embodiments herein also include a method performed by a resource directory node. The method comprises creating a registration entry at the resource directory node describing security capabilities and/or security preferences of a server node, e.g., as well as including information about a resource that the server node hosts. The method may also comprise indicating the security capabilities and/or security preferences of the server node to a client node.

In some embodiments, this indicating comprises receiving, from the client node, a request for information about resources or server nodes associated with one or more certain target attributes, where the target attributes include certain security capabilities and/or security preferences. In this case, indicating may entail transmitting a response to the client node identifying the server node or one or more resources hosted by the server node as being associated with the one or more certain target attributes.

In other embodiments, indicating comprises receiving, from the client node, a request for information about resources or server nodes associated with one or more certain target attributes. In this case, the indicating may entail transmitting a response to the client node that identifies the server node or one or more resources hosted by the server node as being associated with the one or more certain target attributes and that includes information indicating the security capabilities and/or security preferences of the server node.

In any of these embodiments, the client node and/or the server node is a machine-to-machine device and/or an Internet of Things (IoT) node. Alternatively or additionally, the client node and the server node may be configured to communicate using a constrained application protocol, CoAP.

Embodiments herein further include a method performed by a server node configured to assume a server role in a particular message exchange with a client node. The method comprises registering, with a resource directory node, security capabilities and/or security preferences of the server node, e.g., as well as information about a resource that the server node hosts. The method may also comprise setting up a secured connection with the client node using the security capabilities and/or security preferences.

In any of the above embodiments, the security capabilities and/or security preferences indicate a type and/or version of a security protocol that the server node supports. In one embodiment, for instance, the security capabilities and/or security preferences indicate a version of a Transport Layer Security, TLS, protocol or Datagram TLS, DTLS, protocol that the server node supports.

Alternatively or additionally, the security capabilities and/or security preferences in some embodiments indicate one or more cipher suites preferred by the server node and/or one or more key agreement protocols preferred by the server node. Alternatively or additionally, the security capabilities and/or security preferences indicate one or more key exchange algorithms, one or more encryption algorithms, one or more signature algorithms, and/or one or more message authentication code (MAC) algorithms.

Embodiments herein also include corresponding apparatus, computer programs, and carriers (e.g., non-transitory computer-readable mediums).

Embodiments for example include a client node configured to assume a client role in a particular message exchange with a server node. The client node is configured (e.g., via communication circuitry and processing circuitry) to determine, from a resource directory node that stores information about resources, security capabilities and/or security preferences of a server node that hosts a resource and to set up a secured connection with the server node using the determined security capabilities and/or security preferences.

Embodiments also include a resource directory node configured (e.g., via communication circuitry and processing circuitry) to create a registration entry at the resource directory node describing security capabilities and/or security preferences of a server node (e.g., as well as including information about a resource that the server node hosts) and to indicate the security capabilities and/or security preferences of the server node to a client node.

Embodiments further include a server node configured to assume a server role in a particular message exchange with a client node. The server node is configured (e.g., via communication circuitry and processing circuitry) to register, with a resource directory node, security capabilities and/or security preferences of the server node (e.g., as well as information about a resource that the server node hosts).

BRIEF DESCRIPTION OF THE DRAWINGS

FIG. 3A is a table that maps possible values of the TLS/DTLS protocol supported by a server node to integers according to some embodiments.

FIG. 3B illustrates the content of a registration request for registering TLS/DTLS version information at a resource directory node according to some embodiments.

FIG. 3C is a table that maps possible values of a Cipher Suite algorithm preferred by a server node into integers according to some embodiments.

FIG. 3D illustrates the content of a registration request for registering preferred cipher suite information at a resource directory node according to some embodiments.

FIG. 3E illustrates the content of a lookup request for looking up resources supporting a certain TLS/DTLS version according to some embodiments.

FIG. 3F illustrates the content of a lookup request for looking up resources supporting a certain TLS/DTLS version and preferring a certain cipher suite according to some embodiments.

DETAILED DESCRIPTION

Figure 1:
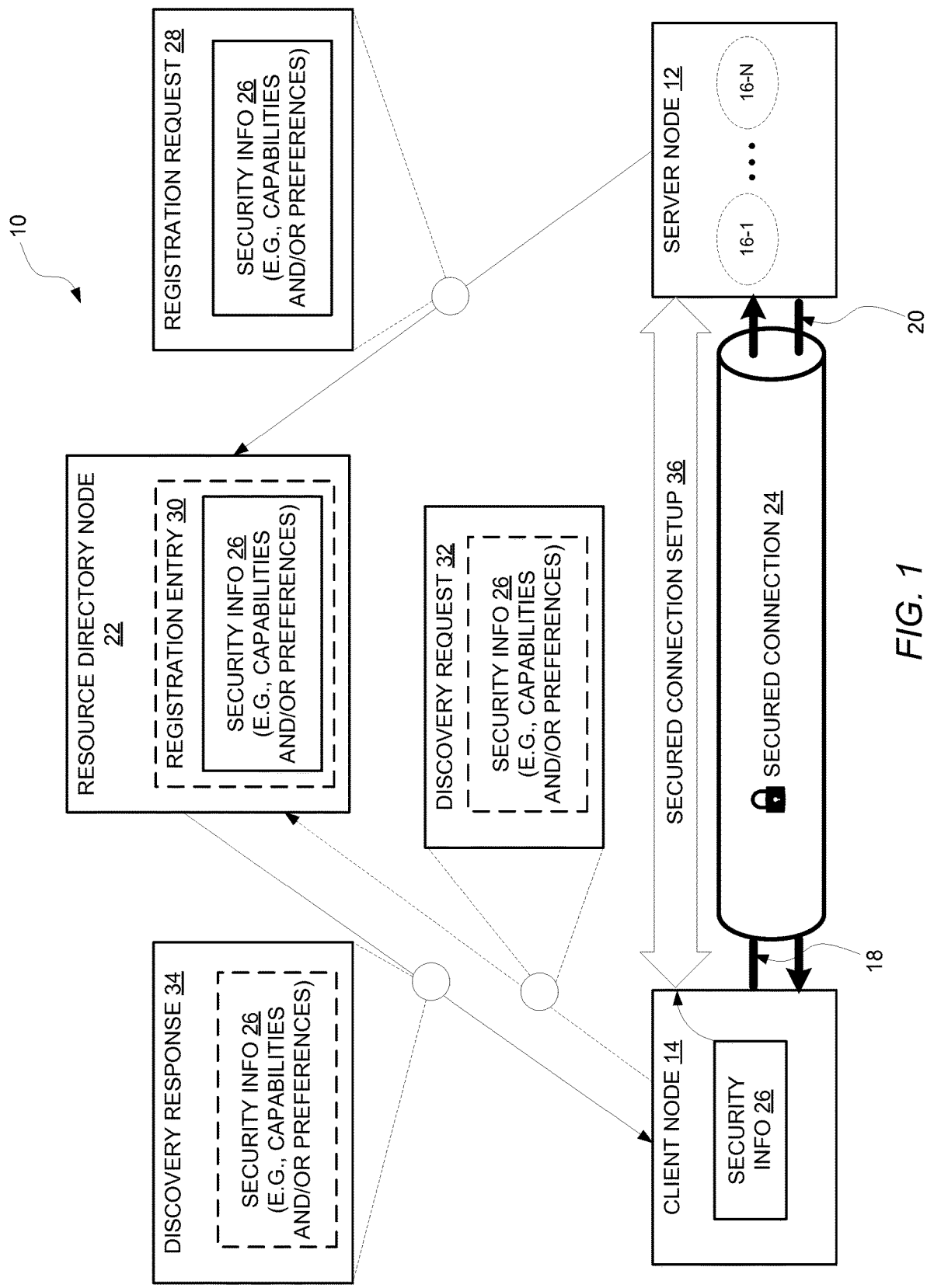
FIG. 1 is a block diagram of a system that includes a client node, a server node, and a resource directory node according to some embodiments.

FIG. 1 shows a communication system 10 that includes one or more server nodes and one or more client nodes, two of which are shown as server node 12 and client node 14. In some embodiments, one or both of the client node 14 and server node 12 may be a constrained node, e.g., the server node 12 may be a temperature sensor. A constrained node may be constrained in terms of processing, power, memory, and/or other resources available at the node. A constrained node may therefore spend extended periods of time in a sleep mode, waking up only periodically to send and receive data. In some embodiments, a constrained node may take the form of an Internet of Things (IoT) node. In these and other embodiments, a constrained node may correspondingly be configured to communicate using a Constrained Application Protocol (CoAP) described in RFC 7252, or any other application layer protocol dedicated for use by constrained nodes. In yet other embodiments, a constrained node may be so constrained that it is unable to support a full-fledged CoAP protocol stack, but merely support UDP/IP transport with raw/small UDP messages for conveying limited and relevant information. Alternatively or additionally, the server node 12 and client node 14 may communicate using any other RESTful application protocol such as the Hyper-Text Transfer Protocol (HTTP).

In these and other embodiments, the server node 12 is a "server" in the sense that it is configured to assume a server role in a message exchange with the client node 14. In the server role, the server node 12 may listen for a request from the client node 14, perform any requested operation, and send a response back to the client node 14. Correspondingly, the client node 14 is a "client" in the sense that it is configured to assume a client role in a message exchange with the server node 12. In the client role, the client node 14 may send a request to the server node 12 and receive a response. Note though that in other embodiments not shown, the server node 12 and client node 14 may assume different roles in other message exchanges, such that the server node 12 may act as a client and/or the client node 14 may act as a server in those other message exchanges.

In any event, with respect to the embodiment shown in FIG. 1, the server node 12 hosts one or more resources 16-1 . . . 16-N (referred to generally as resource(s) 16). A resource 16 in this regard is any item of interest and may be identified by a uniform resource identifier (URI). In embodiments where the system 10 is an Internet of Things (IoT) system, for example, a resource 16 may be a sensor, the current value of a sensor, the location of a device, the current state of an actuator, or the like.

The client node 14 is configured to retrieve and/or modify the state of the one or more resources 16 hosted by the server node 12, e.g., as needed to achieve a certain goal. In some embodiments, for instance, the client node 14 may send a request 18 to the server node 12. The request 18 may request the current representation for a target resource 16 hosted by the server node 12 (e.g., using an HTTP or CoAP GET method) or request that the state of a target resource be created or replaced as specified in the request 18 (e.g., using an HTTP or CoAP PUT method). In some embodiments, the server node 12 may correspondingly send a response 20 back to the client node 14, e.g., including the requested target resource representation or confirming the creation or replacement of the target resource state.

In some embodiments, direct discovery of server nodes in the system 10 by client nodes is not possible or practical, e.g., due to sleeping nodes, disperse networks, or inefficient multicast traffic. In these and other embodiments, the system 10 includes a resource directory node 22, which may be implemented for instance as a web server or entity. The resource directory node 22 stores (i.e., hosts) information about resources in the system 10, e.g., including information that describes which resources are hosted by which server nodes. Client nodes may therefore be configured to send discovery requests to the resource directory node 22 for discovering which resources are available in the system 10 and which server nodes host those resources.

Some embodiments herein exploit the resource directory node 22 additionally or alternatively for effectively assisting the server node 12 and client node 14 in the exchange of security information between them and/or in the set up a secured connection 24 between them as endpoints of the secured connection 24. The secured connection 24 may for instance then be used by the server node 12 and the client node 14 for securely exchanging the request 18 and response 20, e.g., in a way that provides privacy and/or reliability for the exchange. In some embodiments, then, the client node 14 may be a client according to a security protocol used for the connection 24 (e.g., a DTLS client) and the server node 12 may be a server according to the security protocol (e.g., a DTLS server). Regardless, the resource directory node's assistance in setting up the secured connection 24 may in some embodiments advantageously reduce the latency and/or resource consumption associated with the connection setup.

FIG. 1 in more detail shows that the server node 12 registers security information 26 with the resource directory node 22, e.g., by transmitting the security information 26 to the resource directory node 22 within a registration request 28. The registration request 28 may for instance be a POST message containing the information to be added to the resource directory node 22 as the message payload. The server node 12 may do so additionally or alternatively to registering information about the one or more resources 16 that the server node 12 hosts. The security information 26 may be information that is useful or needed for any client node to set up a secured connection with the server node 12. A shown in FIG. 1, for example, the security information 26 may include the security capabilities and/or the security preferences of the server node 12.

In some embodiments, for instance, the security information 26 may indicate a type and/or version of a security protocol that the server node 12 supports. The security information 26 in one embodiment may for example indicate whether the server node 12 supports TLS version 1.0, 1.1, 1.2, and/or 1.3 and may alternatively or additionally indicate whether the server node 12 supports DTLS version 1.0, 1.2, and/or 1.3.

Alternatively or additionally, the security information 26 may indicate one or more cipher suites preferred by the server node 12, e.g., where each cipher suite corresponds to an authenticated encryption with associated data (AEAD) algorithm/hash-based messaged authentication (HMAC)-based key derivation function (HKDF) hash pair For example, the security information 26 may indicate which cipher suite the server node 12 prefers among:
TLS_AES_128_GCM_SHA256,
TLS_AES_256_GCM_SHA384,
TLS_CHACHA20_POLY1305_SHA256,
TLS_AES_128_CCM_SHA256, and
TLS_AES_128_CCM_8_SHA256, as defined according to TLS version 1.2 or 1.3.

Alternatively or additionally, the security information 26 may indicate one or more encryption (i.e., cipher) algorithms and/or message authentication code (MAC) algorithms preferred by the server node 12. For example, the security information 26 may indicate whether the server node 12 prefers an Advanced Encryption Standard (AES) Galois/Counter Mode (GCM) cipher algorithm, an AES Cipher Block Chaining (CBC) cipher algorithm, an AES Counter with CBC Message Authentication Code (CCM) cipher algorithm, a Camellia GCM cipher algorithm, an ARIA GCM cipher algorithm, or the like.

Alternatively or additionally, the security information 26 may indicate one or more key agreement protocols, one or more key exchange algorithms, and/or one or more signature algorithms preferred by the server node 12. In some embodiments, for example, the security information 26 indicates whether the server node 12 prefers a Rivest-Shamir-Adleman (RSA) key agreement algorithm, a Diffie-Hellman (DH) RSA key agreement algorithm, an Elliptic-Curve DH RSA key agreement algorithm, or the like.

No matter the particular nature or type of security information 26, the resource directory node 22 creates a registration entry 30 at the resource directory node 22 with that security information 26. The registration entry 30 may for instance describe the security capabilities and/or preferences of the server node 12. The registration entry 30 in some embodiments also includes information about the one or more resources 16 that the server node 12 hosts. Creation of the registration entry 30 may effectively amount to creation of a new registration resource in the resource directory node 22. In some embodiments, the resource directory node 22 returns the identifier of the created entry 30 to the server node 12, for use by the server node 12 to later inspect, update, refresh, or otherwise maintain that entry 30 as needed.

Having created the registration entry 30 with the security information 26 for the server node 12, the resource directory node 22 at some point thereafter indicates the security information 26 to the client node 14 (e.g., indicates the security capabilities and/or security preferences of the server node 12). The resource directory node 22 may do so for example by actually signalling the security information 26 to the client node 14. FIG. 1 for instance shows that the client node 14 sends a discovery or lookup request 32 to the resource directory node 22 requesting information about resources or server nodes associated with certain target attributes. The resource directory node 22 may transmit a response 34 to the client node 14 that identifies the server node 12 or resource(s) hosted by the server node 12 as having the one or more target attributes. The response 34 may also include at least some of the security information 26 as shown in FIG. 1. Where for instance the client node 14 requests discovery of resources associated with a resource type of "temperature sensor", the resource directory node 22 may respond by identifying the server node 12 as hosting such a resource and by including in the response the security information 26 for the server node 12.

In other embodiments, the resource directory node 22 may indicate the security information 26 to the client node 14 by simply identifying resources or server nodes that are in fact associated with that security information 26. FIG. 1 for instance shows that the client node 14 may include at least some of the security information 26 in its discovery or lookup request 32 to the resource directory node 22, e.g., as one or more of the target attributes specified in the request 32. The resource directory node's response 34 in this case may simply identify the server node 12 or resource(s) hosted by the server node 12 as having the one or more target attributes, e.g., without including the security information 26 in the response 34 itself. Where for instance the client node 14 requests discovery of resources associated with a resource type of "temperature sensor" and a TLS version of 1.3, the resource directory node 22 may respond by identifying the server node 12 as hosting such a resource and as supporting TLS version 1.3.

In these and other ways, the resource directory node 22 may effectively indicate the security information 26 of the server node 12 to the client node 14. The client node 14 according to embodiments herein then sets up the secured connection 24 with the server node 12 using that security information 26. As shown in FIG. 1, for instance, the client node 14 uses the security information 26 in the secured connection setup process or procedure 36. Where the security information 26 indicates the security capabilities and/or security preferences of the server node 12, for example, the client node 14 may set up the secured connection 24 using those capabilities and/or preferences. In fact, the client node 14 may proactively initiate setup of the secured connection 24 according to those security capabilities and/or security preference. For example, the client node 14 may proactively initiate setup of the secured connection 24 according to a TLS/DTLS version that the security information 26 indicates the server node 12 supports and/or according to a cipher suite that the security information 26 indicates the server node 12 prefers.

These and other embodiments, then, may effectively reduce or eliminate the extent to which the client node 14 and server node 12 negotiate during the connection setup procedure 36 itself. For example, with the connection setup proactively initiated by the client node 14 according to a security protocol version supported by the server node 12 and/or a cipher suite preferred by the server node 12, little to no negotiation need take place surrounding the security protocol version and/or cipher suite to use for the secured connection 24. This may in turn reduce the latency required to set up the secured connection 24 and/or the amount of resources (e.g., node processing and power resources, radio resources, etc.) consumed in setting up the secured connection 24. In fact, in some embodiments illustrated above, the resource directory node 22 also serves as a repository for information describing what resources are hosted by which server nodes. In this case, the client node 14 is configured to query the resource directory node 22, meaning that retrieval of the security information 26 from the resource directory node 22 according to some embodiments herein contributes little to no additional latency and/or resource consumption. Moreover, some embodiments realize these advantages even for the first secured connection between the client node 14 and the server node 12, e.g., in that they do not rely on the nodes having been securely connected before or otherwise rely on the nodes being able to resume a previous session between the nodes. Not reliant on session resumption mechanisms, some embodiments herein facilitate secured connection setup even without the nodes having to store information about a previous session.

At least some of these embodiments thereby prove particularly useful for and/or applicable to client nodes and/or server nodes that are resource constrained, e.g., in terms of processing, power, and/or memory resources available. The server node 12 may be so constrained in terms of processing, power, and/or memory resources that it may only support select versions of a security protocol (e.g., only DTLS version 1.3) and/or may only prefer certain cipher suites. This may be the case for instance in certain IoT applications where a simple temperature sensor with extremely limited storage capacity may operate as a server node. Despite the constrained nature of the node(s), though, embodiments herein enable the client node 14 to proactively account for the limited security support and/or preferences of a constrained server node in the way it initiates secured connection setup. Some embodiments thereby prevent or mitigate re-negotiation during secured connection setup that would otherwise occur due to the limited security support and/or preferences of a constrained server node.

Consider in this regard additional details of some embodiments in a context where the client node 14 and the server node 12 may be IoT nodes, e.g., that communicate according to CoAP which forces connections to be secured. CoAP uses TLS and DTLS. There are different versions of TLS and—in contrast—DTLS. Negotiation between the CoAP client and CoAP server regarding which version to use adds at least one round trip to the connection setup process and thereby increases latency. If the CoAP client and server use TLS and/or DTLS Version 1.3, that version reduces the initial handshake from 2 round trips (in version 1.0 and 1.2) down to only a single round trip. But version 1.3 does so, in part, by having the CoAP client guess the key agreement protocol that the CoAP server is likely to select and send that guess along with the cipher suites supported by the CoAP client. If the guess is wrong, or if the CoAP server prefers to use a different cipher suite, the secured connection setup nonetheless incurs additional round trip time and associated setup latency. Worse, initiation of secured connection setup with a CoAP server that only supports TLS/DTLS version(s) that are incompatible with the TLS/DTLS version(s) supported by the CoAP client means the connection setup process will fail and waste resources at the client and server.

Some embodiments herein enable a CoAP client node to know in advance the TLS/DTLS version supported by a CoAP server node and/or the cipher suite or key agreement protocol preferred by the CoAP server node, before starting the initial handshake with the CoAP server node. This advanced knowledge may for instance prevent the CoAP client node 14 from having to institute TLS/DTLS version negotiation and allow the CoAP client node 14 to correctly guess the key agreement protocol that the CoAP server node 12 will select. This advanced knowledge may also or alternatively prevent the CoAP client node 14 from instituting TLS/DTLS setup with a CoAP server node 12 that only supports incompatible TLS/DTLS version(s). This may in turn smooth the TLS/DTLS connection setup between the nodes, saving in latency and in resources (e.g., processing, memory, and energy).

More particularly, some embodiments exploit the resource directory node 22 for not only storing information about resources in the system 10 and their locations, but also for storing the TLS/DTLS version(s) supported by a CoAP server node and/or the cipher suits preferred by a CoAP server node. In fact, in some embodiments, when a CoAP server node registers its resource(s) with the resource directory node 22 (e.g., through a registering interface), the CoAP server also registers the TLS/DTLS version(s) that the server supports and its preferred cipher suit(s). Then, a CoAP client discovering such resource(s) can fetch their location and the CoAP server's security capabilities and/or preferences from the resource directory node 22 and use them in secured connection setup. Alternatively or additionally, a CoAP client may filter lookups to the resource directory node 22 according to the security capabilities and/or security preferences of target CoAP servers.

Consider now details regarding the operations of the resource directory node 22 according to some embodiments. In some embodiments, the resource directory node 22 may be configured in accordance with Internet Engineering Task Force (IETF) standards or specifications, e.g., as described in CoRE Resource Directory draft-ietf-core-resource-directory-13 (Mar. 1, 2018). Where the resource directory node 22 is configured in accordance with IETF standards or specifications, the resource directory node 22 may be referred to as simply a Resource Directory. In these and other embodiments, the Resource Directory enables nodes (e.g., CoAP nodes or IoT nodes) to communicate with different resources in a network, by enabling those nodes to discover the location of the resources in the network. In this regard, the Resource Directory stores information about the resources in the network and their locations. The Resource Directory provides an interface to register, update, remove and query the different resources of the network.

Figure 2:
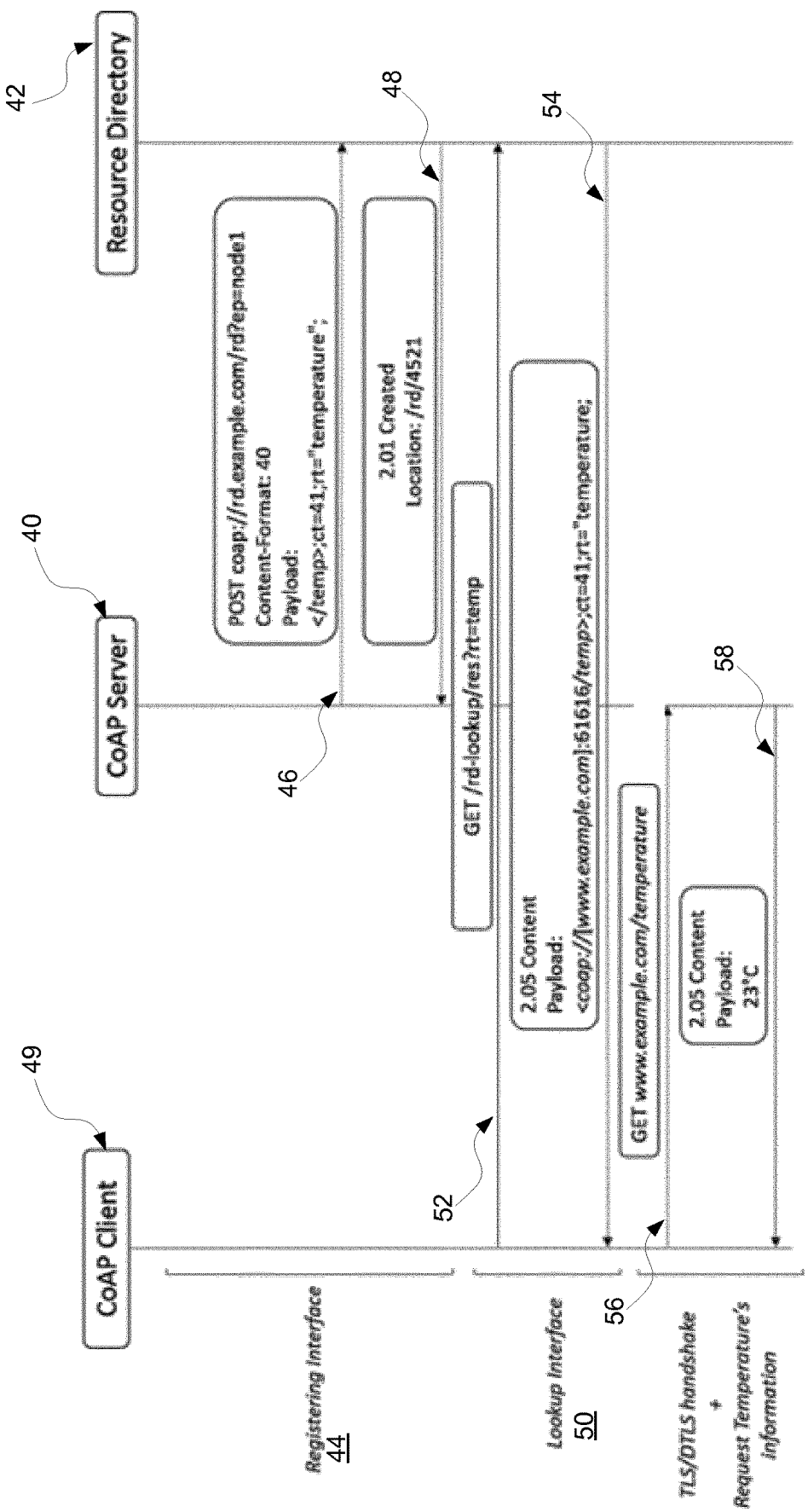
FIG. 2 is a call flow diagram for a CoAP server to register a resource with a Resource Directory and for a CoAP client to lookup resources registered with the Resource Directory, according to some embodiments.

FIG. 2 shows a scenario where a CoAP server 40 registers its resources in the Resource Directory 42. In particular, the CoAP server 40 sends a registration request 46 over a registering interface 44 of the Resource Directory 42. This registering interface 44 accepts a POST from the CoAP server containing a list of resources to be added to the Resource Directory 42 as the message payload, e.g., in the CoRE Link Format (RFC6690), JSON CoRE Link Frmat (application/link-format+json), or CBOR CoRE Link Format (application/link-format+cbor), along with query parameters indicating the name of the CoAP server 40, and optionally the domain and the lifetime of the registration. The Resource Directory 42 may return a response 48 with a code indicating success in creating the requested registration resource at the Resource Directory or indicating failure to do so (e.g., due to service unavailability or a malformed request).

Later, FIG. 2 shows that a CoAP client 49 sends a query 52 to the Resource Directory 42 over a lookup interface 50 for a specific type of resource in the network. In particular, the lookup interface 50 accepts the query 42 in the form of a GET message from the CoAP client 49. The query 42 may specify search criteria for limiting the number of results. The Resource Directory 42 may transmit a response 54 with information about the results that match the query 52, which as shown in this example includes information about the resource registered previously by CoAP server 40. In this case, the CoAP client 49 may initiate the setup of a TLS/DTLS connection with the CoAP server 40 by performing a TLS/DTLS handshake, e.g., via message 56. This enables the CoAP client 49 to securely retrieve application data from the CoAP server 40. In this example where the CoAP server 40 hosts a temperature sensor resource, the CoAP client 49 may retrieve the current value of the temperature sensor resource (23 degrees Celsius) (Step 58).

Some embodiments introduce two new parameters (e.g., on the registering interface 44 and/or lookup interface 50), referred to for example as "TLSVersion" (tv=) and "CipherSuite" (cs=). The TLSVersion parameter indicates the TLS/DTLS version(s) supported or accepted by a CoAP server. FIG. 3A illustrates one example implementation of the TLSVersion parameter in which the parameter has different possible identifier value that identify different respective TLS/DTLS versions. As shown, the identifier value of 0 identifies TLS/DTLS version 1.0, the identifier value of 1 identifies TLS version 1.1, the identifier value of 2 identifies TLS/DTLS version 1.2, and the identifier value of 3 identifies TLS/DTLS version 1.3. According to this example, then, if a CoAP server accepts DTLS version 1.2 and 1.3, the node would parse that information as shown in FIG. 3B. Here, the value of "2,3" for the TLSVersion parameter "tv" indicates that the CoAP server accepts versions 1.2 and 1.3.

Similarly, FIG. 3C illustrates one example implementation of the CipherSuite parameter in which different possible identifier values identify different respective preferred cipher suites. In some embodiments, the identifiers in FIG. 3C have the same values and follow the same order as the DTLS values defined in the IANA cipher suite register. A CoAP server may then indicate its preferred cipher suite(s) by specifying one or more identifiers for the CipherSuite parameter, in ascending or descending order of preference. In some embodiments, the number of preferred cipher suites that may be indicated may be restricted or limited (e.g., to a maximum of 5), due to the number of possible cipher suites being large.

According to this example, then, if a CoAP server prefers to use the "TLS_RSA_WITH_NULL_MD5" and the "TLS_ECDHE_PSK_WITH_AES_128_CCM_8_SHA256" cipher suites (in that order), the CoAP server will parse that information as shown in FIG. 3D. Here, the value of "1,211" for the CipherSuite parameter "cp" indicates that the CoAP server prefers the cipher suite identified by 1 most and then prefers the cipher suite identified by 211 next.

In some embodiments, a CoAP client is configured to use the resource directory node 22 to request information about the resources in a network through a lookup interface. This lookup interface is extended in some embodiments to allow a CoAP client to use TLSVersion and CipherSuite as target attributes by which to filter the returned query results. This interface therefore similarly defines "TLSVersion" (tv=) and "CipherSuite" (cs=) as target attributes by which to filter returned query results. For instance, if a CoAP client wants to know the temperature resources located in the system 10 that support DTLS version 1.3, the CoAP client would send the query shown in FIG. 3E to the resource directory node 22. Alternatively or additionally, if a CoAP client wants to search the temperature resources of the system 10 for resources that support DTLS versions 1.2 and 1.3, and accepting cipher suites TLS_ECDHE_PSK_WITH_AES_256_GCM_SHA384 and TLS_NULL_WITH_NULL_NULL (in that order of preference), the request would be generated as shown in FIG. 3F.

Figure 4:
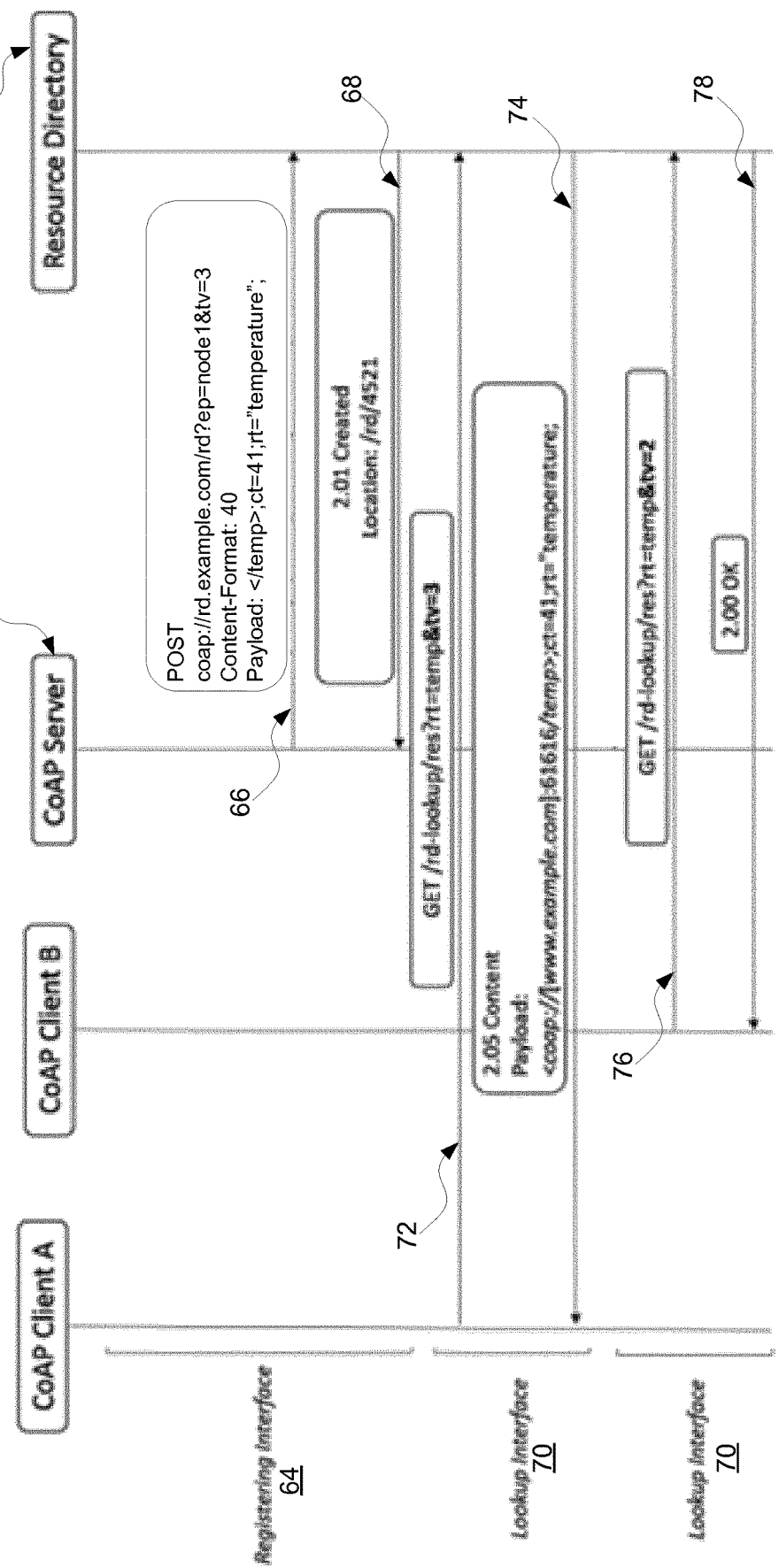
FIG. 4 is a call flow diagram for a CoAP server to register a supported DTLS version and for CoAP clients to lookup resources supported a certain DTLS version according to some embodiments.

FIG. 4 illustrates a simple example. As shown, a CoAP server 60 sends a registration request 66 to a Resource Directory 62 over a registering interface 64. The registration request 66 requests registration of its temperature resource and indicates its support for TLS/DTLS version 1.3. The Resource Directory 62 correspondingly sends a response 68 that confirms creation of a registration entry according to the request 66. Later, CoAP client A sends, over a lookup interface 70, a lookup request 72 to the resource directory 62 requesting information about any registered temperature resources in the system 10 that support TLS/DTLS version 1.3. The Resource Directory 62 then sends a response 64 to CoAP client A identifying the temperature resource hosted by CoAP server 60. By contrast, CoAP client B sends over the lookup interface 70 a lookup request 76 requesting information about any registered temperature resources in the system 10 that support TLS/DTLS version 1.2. In this case, the resource directory 62 sends a response 78 to CoAP client B indicating that no such resource is registered in the system 10, since CoAP server 60 did not indicate support for TLS/DTLS version 1.2.

Some embodiments thereby define two new parameters, TLSVersion and CipherSuite, in the registration, update, and lookup interfaces of a resource directory. The parameters may be used by different CoAP or IoT endpoints to define or filter the different resources available in the system 10. This may effectively speed up TLS/DTLS connection setup in IoT and other contexts (less latency) and/or minimize the usage of resources by the devices.

Generally, then according to some embodiments a server node 12 and a client node 14 exchange security parameters between them through a Resource Directory. The server node 12 includes in the registration and/or update interfaces of the Resource Directory some security information (e.g., security capabilities and/or security preferences) of the server node 12 to facilitate the future security communication with client node 14. The client node 14 determines, from the lookup interface of the Resource Directory, the security information (e.g., security capabilities and/or security preferences) of a specific server node 12. The client node 14 can utilize that information to set up a secured connection 24 with that server node 12 using the determined security information (e.g., security capabilities and/or security preferences).

Note that the resource directory node 22 as used herein may be any node that stores information about resources in the system 10, including the security information 26 described above. In some embodiments, the resource directory node 22 functions as a centralized repository for such information in the system 10. In other embodiments, the resource directory node 22 may be just one of multiple physical nodes that store resource-related information in a distributed fashion. In one such embodiment, for instance, the resource directory node 22 may be one of multiple peers in a Resource Location and Discovery (RELOAD) overlay network that provides a resource discovery mechanisms for CoAP endpoints, as described in International Patent Application Number PCT/EP2011/070064.

Note similarly that a client node 14 used herein may be any node capable of or configured to operate as a client with respect to a server node 12, at least with respect to a particular message exchange. The client node 14 may for instance operate as a client from the perspective of a REST architecture, e.g., as a CoAP client or HTTP client. Alternatively or additionally, the client node 14 may operate as a client from the perspective of a security protocol, e.g., as a TLS/DTLS client. A client node 14 in some embodiments may be a wireless device, also referred to as a user equipment (UE). Correspondingly, a server node 12 used herein may be any node capable of or configured to operate as a server with respect to a client node 14, at least with respect to a particular message exchange. The server node 12 may for instance operate as a server from the perspective of a REST architecture, e.g., as a CoAP server or HTTP server. Alternatively or additionally, the server node 12 may operate as a server from the perspective of a security protocol, e.g., as a TLS/DTLS server. A server node 12 in some embodiments may be a wireless device, also referred to as a user equipment (UE). As explained above, though, a client node 14 in some embodiments may be capable of or configured to operate as a client in some contexts, but operate as a server in other contexts. And a server node 12 in some embodiments may be capable of or configured to operate as a server in some contexts, but operate as a client in other contexts.

Figure 5:
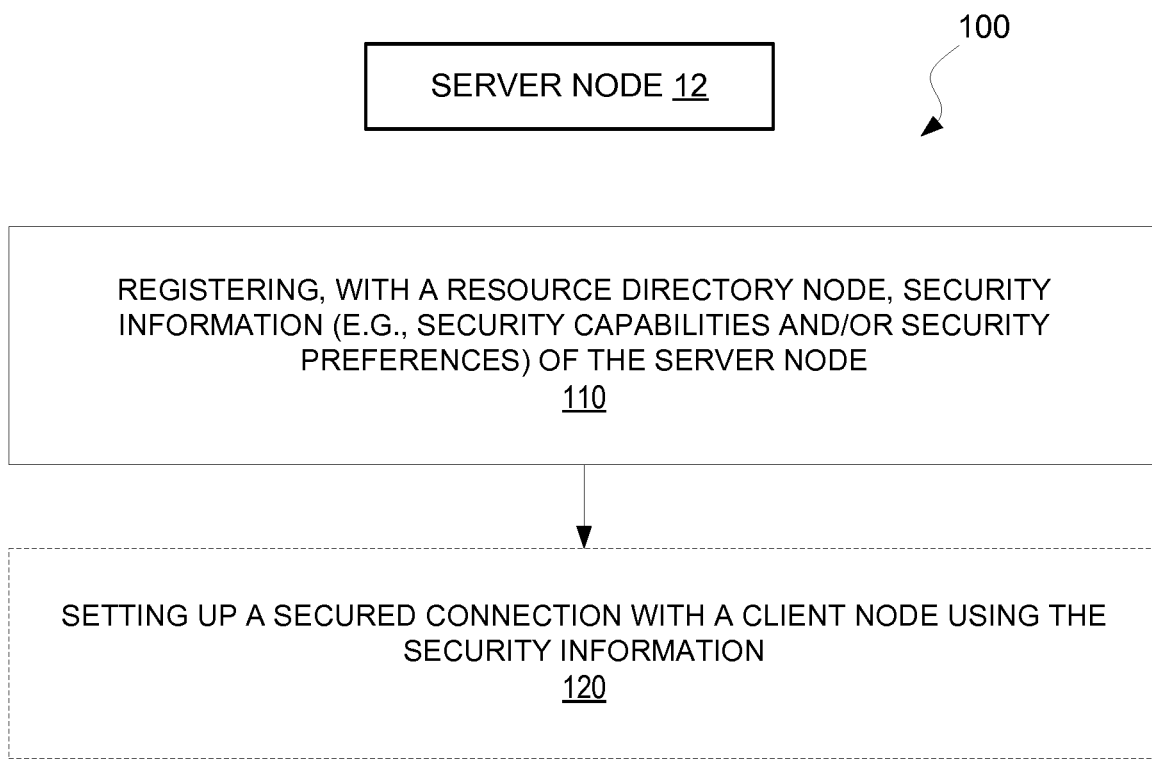
FIG. 5 is a logic flow diagram of a method performed by a server node according to some embodiments.

In view of the above modifications and variations, FIG. 5 illustrates a method 100 performed by a server node 12 configured to assume a server role in a particular message exchange with a client node 14 according to some embodiments. As shown, the method 100 includes registering, with a resource directory node 22, security information 26 (e.g., security capabilities and/or security preferences) of the server node 12 (Block 110). In some embodiments, such registering also entails registering information about a resource that the server node 12 hosts. In one or more embodiments, the method 100 further comprises setting up a secured connection with a client node 14 using the security information 26 (Block 120).

Figure 6:
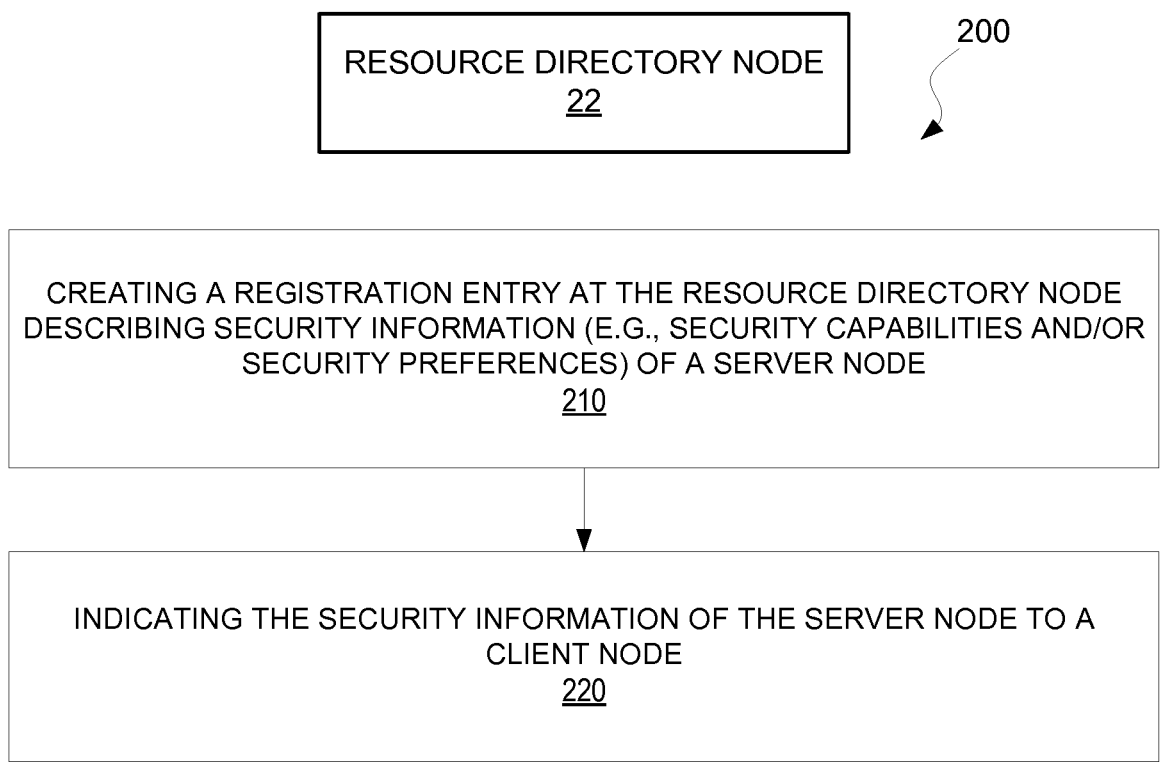
FIG. 6 is a logic flow diagram of a method performed by a resource directory node according to some embodiments.

FIG. 6 illustrates a method 200 performed by a resource directory node 22 according to some embodiments. As shown, the method 200 includes creating a registration entry at the resource directory node 22 describing security information 26 (e.g., security capabilities and/or security preferences) of a server node 12 (Block 210). In some embodiments, the registration entry also includes information about a resource 16 that the server node 12 hosts. The method 200 in some embodiments also includes indicating the security information 26 (e.g., security capabilities and/or security preferences) of the server node 12 to a client node 14 (Block 220). In one embodiment, for instance, the security information 26 is indicated to the client node 14 in advance of the client node 14 initiating setup of a secured connection 24 with the server node 12.

In some embodiments, the resource directory node 22 may do so for example by actually signalling the security information 26 to the client node 14. In this case, the method 200 may comprise receiving a discovery or lookup request 32 from the client node 14 requesting information about resources or server nodes associated with certain target attributes. The method 20 may then further comprise transmitting a response 34 to the client node 14 that identifies the server node 12 or resource(s) hosted by the server node 12 as having the one or more target attributes. The response 34 may also include at least some of the security information 26.

In other embodiments, the resource directory node 22 may indicate the security information 26 to the client node 14 by simply identifying resources or server nodes that are in fact associated with that security information 26. In this case, the method 200 may comprise receiving a discovery or lookup request 32 that includes at least some of the security information 26, e.g., as one or more of the target attributes specified in the request 32. The method 200 may then comprise transmitting a response 34 that simply identifies the server node 12 or resource(s) hosted by the server node 12 as having the one or more target attributes, e.g., without including the security information 26 in the response 34 itself.

Figure 7:
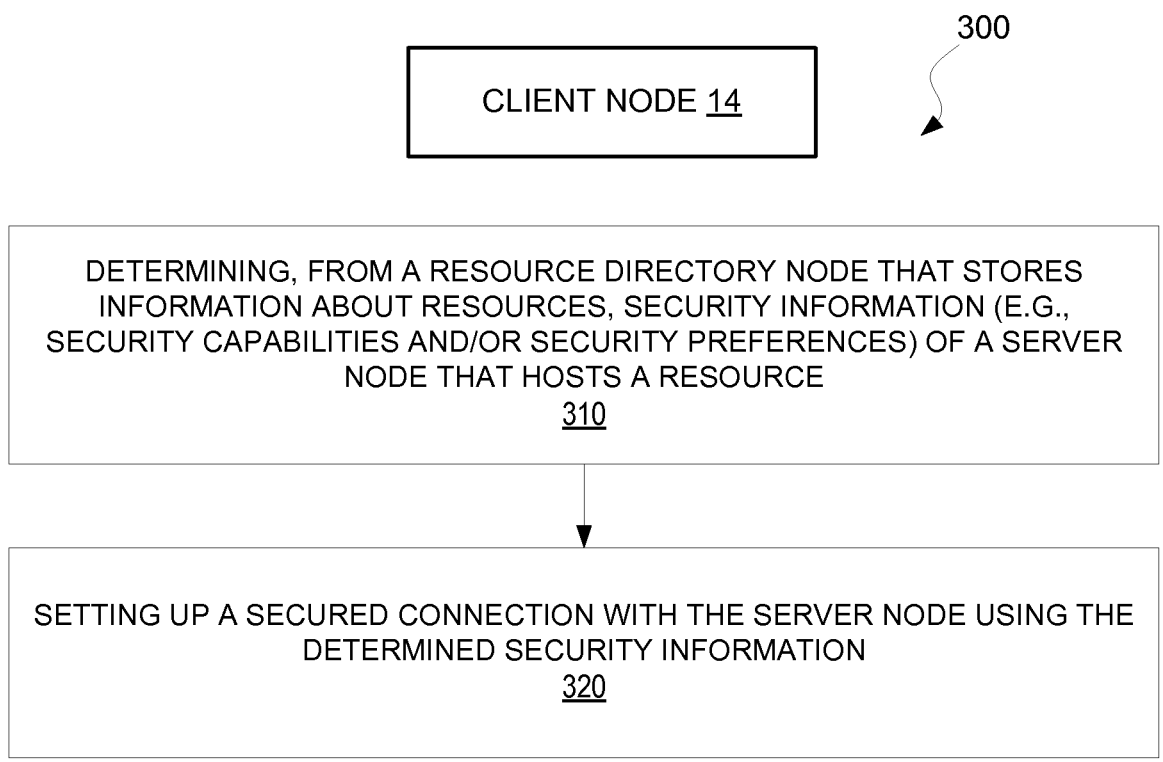
FIG. 7 is a logic flow diagram of a method performed by a client node according to some embodiments.

FIG. 7 illustrates a method 300 performed by a client node 14 configured to assume a client role in a particular message exchange with a server node 12 according to some embodiments. As shown, the method 300 includes determining, from a resource directory node 22 that stores information about resources, security information 26 (e.g., security capabilities and/or security preferences) of a server node 12 that hosts a resource (Block 310). In one embodiment, for instance, the security information 26 is determined in advance of the client node 14 initiating setup of a secured connection 24 with the server node 12. In some embodiments, the method 300 also includes determining information about a resource 16 that the server node 12 hosts. The method 300 in some embodiments also includes setting up a secured connection 24 with the server node 12 using the determined security information 26 (e.g., security capabilities and/or security preferences) (Block 320). In fact, in some embodiments, this entails (proactively) initiating setup of the secured connection 24 according to the security information 26 (e.g., security capabilities and/or security preferences) of the server node 12.

In some embodiments, the client node 14 may determine the security information by receiving signalling from the resource directory node 22 that includes the security information 26. In this case, the method 300 may comprise transmitting a discovery or lookup request 32 from the client node 14 to the resource directory node 22 requesting information about resources or server nodes associated with certain target attributes. The method 30 may then further comprise receiving a response 34 from the resource directory node 22 that identifies the server node 12 or resource(s) hosted by the server node 12 as having the one or more target attributes. The response 34 may also include at least some of the security information 26.

In other embodiments, the client node 14 may determine the security information 26 based on signalling from the resource directory node 22 identifying resources or server nodes that are associated with that security information 26. In this case, the method 300 may comprise transmitting a discovery or lookup request 32 from the client node 14 to the resource directory node 22 that includes at least some of the security information 26, e.g., as one or more of the target attributes specified in the request 32. The method 300 may then comprise receiving a response 34 that simply identifies the server node 12 or resource(s) hosted by the server node 12 as having the one or more target attributes, e.g., without including the security information 26 in the response 34 itself.

Note that the nodes described above may perform the methods herein and any other processing by implementing any functional means, modules, units, or circuitry. In one embodiment, for example, the nodes comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8A:
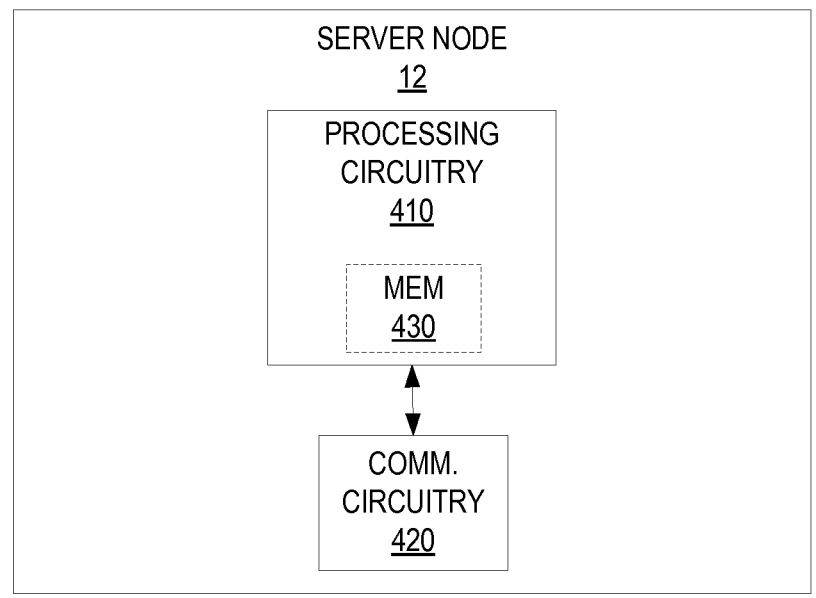
FIG. 8A is a block diagram of a server node according to some embodiments.

FIG. 8A for example illustrates a server node 12 as implemented in accordance with one or more embodiments. As shown, the server node 12 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the server node 12. The processing circuitry 410 is configured to perform processing described above (e.g., in FIG. 5), such as by executing instructions stored in memory 430. The processing circuitry 410 in this regard may implement certain functional means, units, or modules.

Figure 8B:
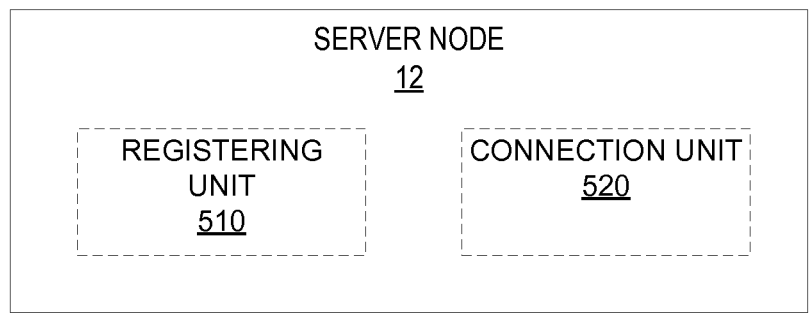
FIG. 8B is a block diagram of a server node according to other embodiments.

FIG. 8B illustrates a schematic block diagram of a server node 12 according to still other embodiments. As shown, the server node 12 implements various functional means, units, or modules, e.g., via the processing circuitry 410 in FIG. 8A and/or via software code. These functional means, units, or modules, e.g., for implementing the method in FIG. 5, include for instance a registering unit 510 for registering, with a resource directory node 22, security information 26 (e.g., security capabilities and/or security preferences) of the server node 12. Also included may be a connection unit 520 for setting up a secured connection with a client node 14 using the security information 26.

Figure 9A:
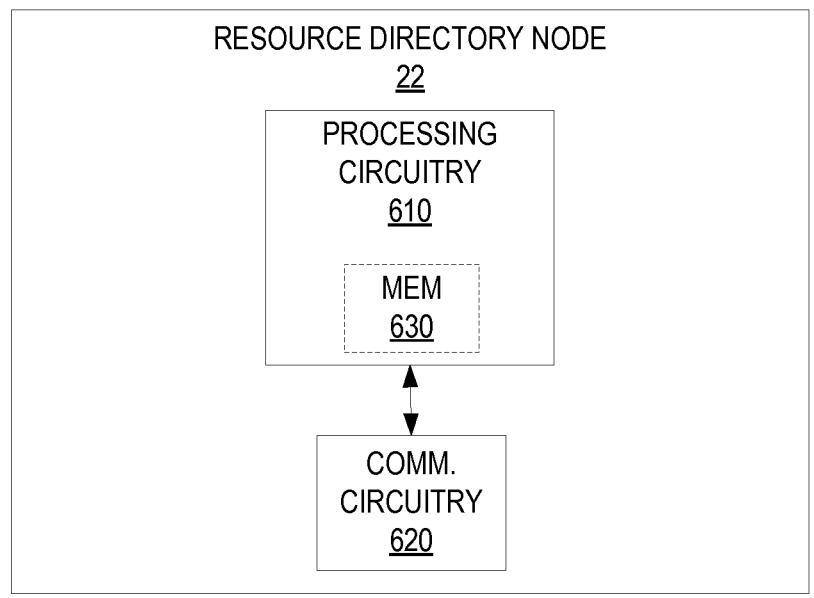
FIG. 9A is a block diagram of a resource directory node according to some embodiments.

FIG. 9A illustrates a resource directory node 22 as implemented in accordance with one or more embodiments. As shown, the resource directory node 22 includes processing circuitry 610 and communication circuitry 620. The communication circuitry 620 (e.g., radio circuitry) is configured to transmit and/or receive information to and/or from one or more other nodes, e.g., via any communication technology. Such communication may occur via one or more antennas that are either internal or external to the resource directory node 22. The processing circuitry 610 is configured to perform processing described above (e.g., in FIG. 6), such as by executing instructions stored in memory 630. The processing circuitry 610 in this regard may implement certain functional means, units, or modules.

Figure 9B:
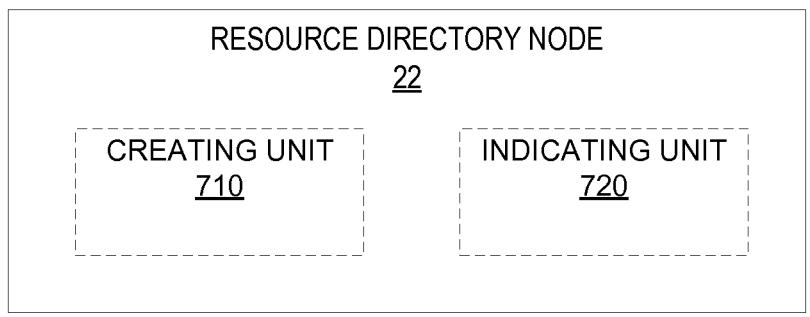
FIG. 9B is a block diagram of a resource directory node according to other embodiments.

FIG. 9B illustrates a schematic block diagram of a resource directory node 22 according to still other embodiments. As shown, the resource directory node 22 implements various functional means, units, or modules, e.g., via the processing circuitry 610 in FIG. 9A and/or via software code. These functional means, units, or modules, e.g., for implementing the method in FIG. 6, include for instance a creating unit 710 for creating a registration entry at the resource directory node 22 describing security information 26 (e.g., security capabilities and/or security preferences) of a server node 12. Also included may be an indicating unit 720 for indicating the security information 26 (e.g., security capabilities and/or security preferences) of the server node 12 to a client node 14.

Figure 10A:
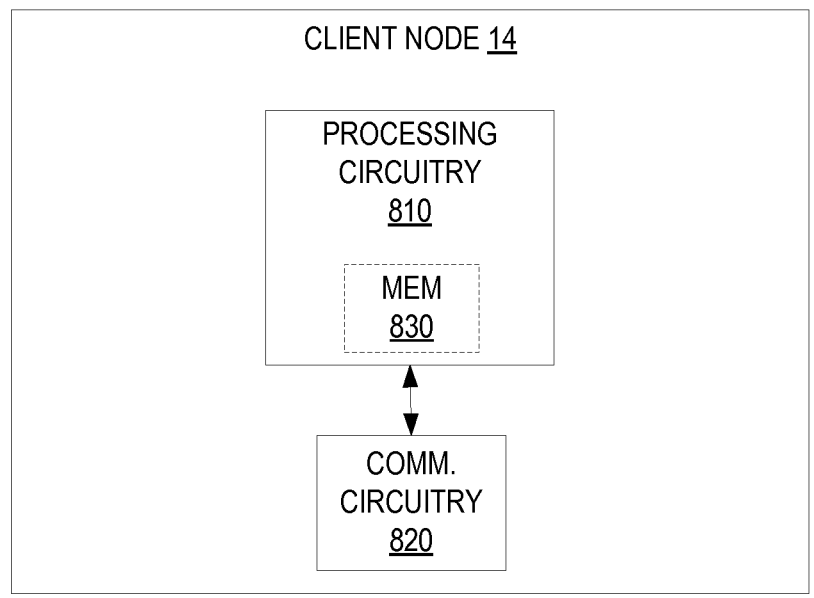
FIG. 10A is a block diagram of a client node according to some embodiments.

FIG. 10A illustrates a client node 14 as implemented in accordance with one or more embodiments. As shown, the client node 14 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the client node 14. The processing circuitry 810 is configured to perform processing described above (e.g., in FIG. 7), such as by executing instructions stored in memory 830. The processing circuitry 810 in this regard may implement certain functional means, units, or modules.

Figure 10B:
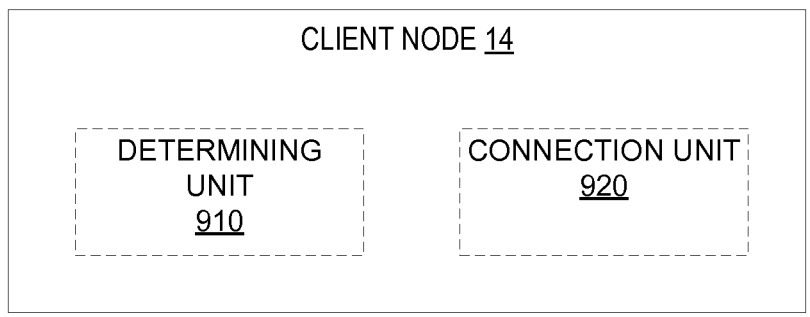
FIG. 10B is a block diagram of a client node according to other embodiments.

FIG. 10B illustrates a schematic block diagram of a client node 14 according to still other embodiments. As shown, the client node 14 implements various functional means, units, or modules, e.g., via the processing circuitry 810 in FIG. 10A and/or via software code. These functional means, units, or modules, e.g., for implementing the method in FIG. 7, includes for instance a determining unit 910 for determining, from a resource directory node 22 that stores information about resources, security information 26 (e.g., security capabilities and/or security preferences) of a server node 12 that hosts a resource. Also included may be a connection unit 920 for setting up a secured connection 24 with the server node 12 using the determined security information 26 (e.g., security capabilities and/or security preferences).

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a non-transitory computer readable (storage or recording) medium that has stored thereon instructions that, when executed by a processor of a node, cause the node to perform as described above.

Although the subject matter described herein may be implemented in any appropriate type of system using any suitable components, the embodiments disclosed herein may be described in relation to a wireless network. In this case, the client node 14 and/or server node 12 described above may take the form of a wireless device in a wireless network. The wireless network may provide communication and other types of services to one or more wireless devices to facilitate the wireless devices' access to and/or use of the services provided by, or via, the wireless network. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Narrowband Internet of Things (NB-IoT), and/or any other appropriate wireless communication standard, such as the Bluetooth, Z-Wave and/or ZigBee standards.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, a smart meter etc. A WD may support device-to-device (D2D) communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a client node configured to assume a client role in a particular message exchange with a server node, the method comprising:
   determining, from a resource directory node that stores information about resources, at least one of security capabilities and security preferences of the server node that hosts a resource, wherein the at least one of security capabilities and security preferences indicates one or more cipher suites preferred by the server node, wherein the server node indicates its preference of the cipher suites by specifying one or more identifiers for a CipherSuite parameter, in ascending or descending order of the preference, and wherein each cipher suite of the one or more cipher suites corresponds to an authenticated encryption with associated data (AEAD) algorithm or a hash-based messaged authentication (HMAC)-based key derivation function (HKDF) hash pair; and
   setting up a secured connection with the server node using the determined at least one of security capabilities and security preferences.

2. The method of claim 1, wherein setting up the secured connection comprises initiating setup of the secured connection according to the at least one of security capabilities and security preferences of the server node.

3. The method of claim 1, wherein said determining comprises:
   transmitting, from the client node to the resource directory node, a request for information about resources or server node associated with one or more certain target attributes, wherein the target attributes include the at least one of security capabilities and security preferences; and
   receiving a response from the resource directory node identifying the server node, or one or more resources hosted by the server node, as being associated with the one or more certain target attributes.

4. The method of claim 1, wherein said determining comprises:
   transmitting, from the client node to the resource directory node, a request for information about resources or server nodes associated with one or more certain target attributes; and
   receiving a response from the resource directory node that identifies the server node, or one or more resources hosted by the server node, as being associated with the one or more certain target attributes and that includes information indicating the at least one of security capabilities and security preferences of the server node.

5. The method of claim 1, wherein the at least one of the client node and the server node is a machine-to-machine device or an internet-of-things (IoT) node.

6. The method of claim 1, wherein the client node and the server node are configured to communicate using a constrained application protocol (CoAP).

7. A method performed by a server node configured to assume a server role in a particular message exchange with a client node, the method comprising:
   registering, with a resource directory node, at least one of security capabilities and security preferences of the server node, as well as information about a resource that the server node hosts, wherein the at least one of security capabilities and security preferences indicates one or more cipher suites preferred by the server node, wherein the server node indicates its preference of the cipher suites by specifying one or more identifiers for a CipherSuite parameter, in ascending or descending order of the preference, and wherein each cipher suite of the one or more cipher suites corresponds to an authenticated encryption with associated data (AEAD) algorithm or a hash-based messaged authentication (HMAC)-based key derivation function (HKDF) hash pair.

8. The method of claim 7, wherein the at least one of security capabilities and security preferences indicate at least one of a type or a version of a security protocol that the server node supports.

9. The method of claim 7, wherein the at least one of security capabilities and security preferences indicate a version of a Transport Layer Security (TLS) protocol or Datagram TLS (DTLS) protocol that the server node supports.

10. The method of claim 7, wherein the at least one of security capabilities and security preferences indicate one or more key agreement protocols preferred by the server node.

11. The method of claim 7, wherein the at least one of security capabilities and security preferences indicate at least one of one or more key exchange algorithms, one or more encryption algorithms, one or more signature algorithms, or one or more message authentication code (MAC) algorithms.

12. A client node configured to assume a client role in a particular message exchange with a server node, the client node configured to:
   determine, from a resource directory node that stores information about resources, at least one of security capabilities and security preferences of the server node that hosts a resource, wherein the at least one of security capabilities and security preferences indicates one or more cipher suites preferred by the server node, wherein the server node indicates its preference of the cipher suites by specifying one or more identifiers for a CipherSuite parameter, in ascending or descending order of the preference, and wherein each cipher suite of the one or more cipher suites corresponds to an authenticated encryption with associated data (AEAD) algorithm or a hash-based messaged authentication (HMAC)-based key derivation function (HKDF) hash pair; and
   set up a secured connection with the server node using the at least one of determined security capabilities and the security preferences.

13. A server node configured to assume a server role in a particular message exchange with a client node, the server node configured to:
   register, with a resource directory node, at least one of security capabilities and security preferences of the server node, as well as information about a resource that the server node hosts, wherein the at least one of security capabilities and security preferences indicates one or more cipher suites preferred by the server node, wherein the server node indicates its preference of the cipher suites by specifying one or more identifiers for a CipherSuite parameter, in ascending or descending order of the preference, and wherein each cipher suite of the one or more cipher suites corresponds to an authenticated encryption with associated data (AEAD) algorithm or a hash-based messaged authentication (HMAC)-based key derivation function (HKDF) hash pair.

\* \* \* \* \*